Dec. 2, 1958     F. A. CAMPBELL     2,862,301
HOLE GAUGE WITH THREADED AND CAM ADJUSTING MEANS
Filed Aug. 9, 1956
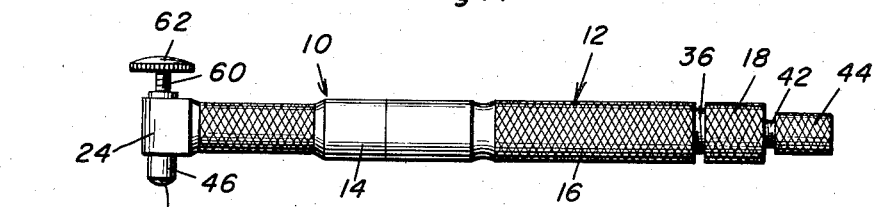
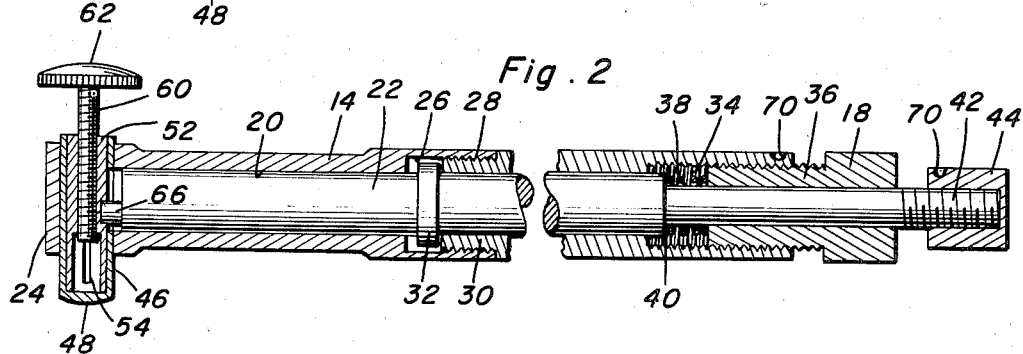
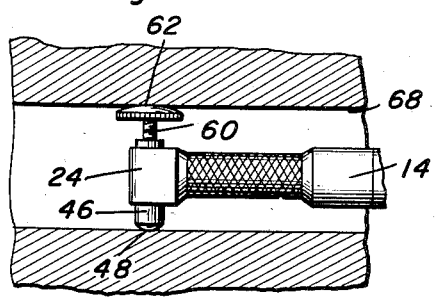
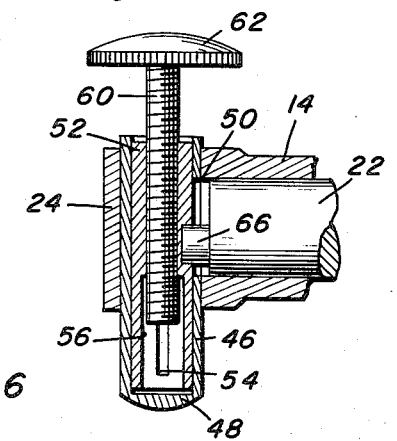
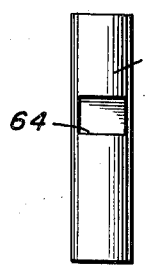
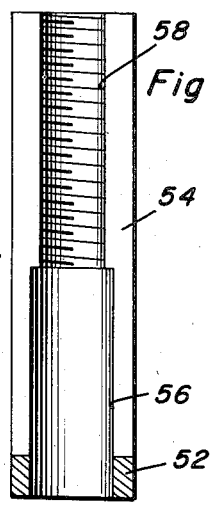
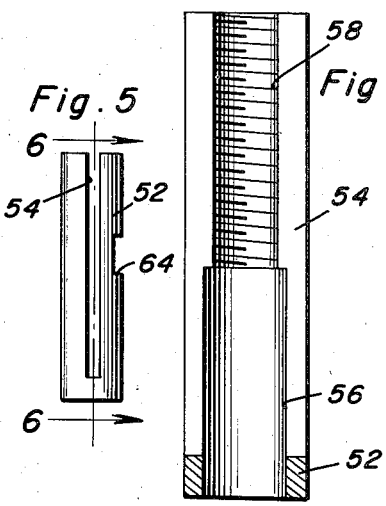
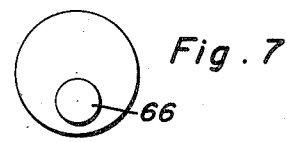
Floyd A. Campbell
INVENTOR.

United States Patent Office 2,862,301
Patented Dec. 2, 1958

2,862,301
HOLE GAUGE WITH THREADED AND CAM ADJUSTING MEANS

Floyd A. Campbell, Springfield, Ohio

Application August 9, 1956, Serial No. 603,108

4 Claims. (Cl. 33—143)

This invention generally relates to a measuring device and more particularly to a gauge for determining the internal diameter of holes, passageways or bores.

An object of the present invention is to provide a gauge specifically adapted for measurement of the internal diameter of holes which includes opposed contact tips which are adjustable by screw threaded means for approximate settings of the tips together with a fine adjustment by means of an eccentric or cam adjusting means.

Another object is to provide a gauge in accordance with the preceding objects which includes a device for locking the adjustable features of the gauge so that the gauge may be locked after the measurements have been determined.

A further important object of the present invention is to provide cam operated fine adjusting means together with the locking means which may be actuated while the measuring tips are in direct contact with the internal surfaces.

Other objects of the present invention will reside in its simplicity of construction, ease of operation, adaptation for its particular purposes and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the gauge;

Figure 2 is a longitudinal vertical sectional view taken substantially upon a plane passing along the longitudinal center of the present invention with certain of the adjusting details illustrated;

Figure 3 is an enlarged sectional view of the threaded spindle enclosed by the split bushing which is controlled by the cam means;

Figure 4 is an elevational view of the split bushing;

Figure 5 is a side elevational view of the construction of Figure 4;

Figure 6 is a vertical sectional view taken substantially upon a plane passing along section line 6—6 of Figure 5 illustrating the details of construction of the split bushing;

Figure 7 is an end elevational view of the actuating rod with the eccentric pin for projection thereon; and Figure 8 is a fragmentary view illustrating the manner of use of the present invention.

Referring now specifically to the drawings, the numeral 10 generally designates the gauge of the present invention which includes an elongated tubular handle generally designated by the numeral 12 which includes a first tubular portion 14 and a second tubular portion 16 as well as a locking knob 18. The first tubular member 14 is provided with a longitudinal bore 20 which rotatably and slidably receives an elongated rod 22. At one end of the first tubular member 14 is a transverse tubular housing portion 24 which is in communication with the longitudinal bore 20. At the other end of the first tubular member 14 is provided a counterbore 26 which is larger in diameter than the bore 20 having a portion thereof screw threaded as indicated by the numeral 28 for receiving the threaded portion 30 of the second tubular member 16. Disposed between the inner end of the counterbore 26 and the end of the threaded portion 30 of the tubular member 16 is a peripheral flange 32 on the rod 22 wherein the threaded portion 30 may engage the flange 32 for limiting the outward longitudinal movement of the rod to retain the device in assembled relation.

The second tubular portion 16 is provided with an internally threaded counterbore 34 for receiving a threaded portion 36 of the locking knob 18. A compression coil spring 38 is disposed between the inner end of the threaded portion 36 of the locking knob 18 and a shoulder 40 on the elongated rod 22 thereby providing a frictional resistance to the turning of the rod 22 and also a positive lock therefor depending upon the inward movement of the threaded portion 36 due to rotation of the locking knob 18.

The outer end of the rod 22 is provided with a threaded portion 42 having an actuating knob 44 thereon wherein the rod 22 may be rotated in relation to the tubular handle 12 by grasping the knob 44.

Referring now specifically to Figure 3, it will be seen that the transverse tubular housing 24 is provided with a rigid sleeve 46 having a closed rounded bottom end 48 and an aperture 50 in registry with the longitudinal bore 20. Slidably disposed in the sleeve 46 is a split bushing 52 having a pair of diametrically opposed slots 54 extending from the upper end substantially to the bottom end but terminating in spaced relation to the bottom end wherein the two halves of the split bushing 52 formed by the slots 54 will permit springing movement towards each other when pressure is exerted against opposite sides of the bushing 52. The interior of the bushing 52 is hollow as designated by the numeral 56 and a portion thereof internally threaded as designated by the numeral 58 for receiving a threaded stud 60 on an enlarged rounded tip member 62 at the outer end thereof.

One side of the split bushing 52 is provided with a transverse groove 64 for receiving a cylindrical projection 66 which is eccentrically disposed on the inner end of the rod 22. The eccentric relation of the projection or pin 66 in engagement with the transverse slot or groove 64 will cause reciprocation of the bushing 52 in the sleeve 46 upon rotation of the rod 22 about a longitudinal axis. Inasmuch as the stud 60 is in screw threaded engagement in the bushing 52, this will cause outward movement of the rounded tip 62 in relation to the rounded tip 48 thus urging the tips 62 and 48 into engagement with diametrically opposed points on an internal bore such as that designated by numeral 68 in Figure 8. The inward force on the rod 22 exerted by spring 38 causes the pin 66 to engage forcibly the bottom or inner surface of the groove 64, thereby urging the portion of the bushing 52 having the groove 64 therein towards the other portion thereby clampingly engaging the threaded stud 60 and also urging bushing 52 against the inner wall of sleeve 46 opposite aperture 50 thereby locking the tips 48 and 62 in relation to each other thus permitting the tips 48 and 62 to be accurately measured for determining the diameter of the internal bore or hole 68. The flange 32 on rod 22 prevents withdrawal of rod 22 beyond a certain limit thereby preventing accidental disengagement of the pin 66 from the groove 64.

An initial adjustment may be provided for approximating the diameter of the aperture or hole 68 by engaging the knurled edge of the tip 62 and threading the same inwardly or outwardly as desired. The frictional resistance to hold the members in adjusted position may be determined by threading the knob 18 inwardly and outwardly and the rotation of the rod 22 may be manipulated by the knob 44. It is evident that if the adjusting knob 44 be rotated 180°, the bushing 52 will be impelled longitudinally in the housing 24 a distance equal to the diametrical throw of the eccentric cam 66. For practical purposes, an approximate maximum of movement will be .015 inch and the minimum will be .005 inch. Of course, a smaller throw will provide a finer or slower movement of the tip 62. The handle portion 16 and the knob 44 are each provided with reference marks or witness marks 70 to indicate that when these marks are lined up the eccentric 66 will have the bushing 52 in such a position that full advantage may be taken in the expansion of the tips 62 and 48. Inasmuch as the tension exerted by the partially compressed spring 38 continues to compress bushing 52 during the longitudinal sliding movement thereof, the threaded position of the spindle or stud 60 does not change. The tension of the spring is usually sufficient to prevent slippage of any moving part during withdrawal for measurement by micrometer or other measuring instrument but if desired, the locking knob 18 may be tightened until the spring 42 is completely compressed and all of the elements are securely locked to prevent either rotary or longitudinal movement.

The foregoing is considered as illustrative only of the principles of the invention. Further, since numerous modifications and changes will readily occur to those skilled in the art it is not desired to limit the invention to the exact construction and operation shown and described, and accordingly all suitable modifications and equivalents may be resorted to, falling within the scope of the invention as claimed.

What is claimed as new is as follows:

1. A gauge for measuring comprising an elongated tubular member, an elongated rod slidably and rotatably disposed in said tubular member, said tubular member having a transverse bore at the outer end thereof, a transversely adjustable member mounted in said bore, means interconnecting said adjustable member and the rod for movement of the member upon rotation of the rod and locking of the member upon longitudinal movement of the rod, handle means on the rod for rotation of the same, means for holding the rod in adjusted angular position, and means for moving said rod longitudinally for locking the adjustable transverse member in adjusted position, said adjustable member including a split bushing having an internally threaded bore, a sleeve rigid with the transverse bore at the outer end of the tubular member, said sleeve slidably receiving said bushing, a threaded stud in the split portion of said bushing, and a rounded tip on the end of said stud, said sleeve having a rounded tip for coaction with the rounded tip on the stud for contacting inner surfaces of apertures.

2. The combination of claim 1 wherein said means interconnecting the adjustable member and the rod includes an eccentrically disposed longitudinal projection on the end of said rod, said bushing having a transverse groove receiving said projection whereby rotation of the rod will cause reciprocation of the bushing.

3. The combination of claim 2 wherein means for limiting the longitudinal movement of said rod is provided and includes a peripheral flange on the rod and a threaded member mounted on said tubular member for engagement with the flange whereby the flange will limit the outward movement of the rod.

4. The combination of claim 3 wherein the means for holding the rod in adjusted angular position includes a partially compressed coil spring.

References Cited in the file of this patent

UNITED STATES PATENTS

| | | |
|---|---|---|
| 2,134,516 | James | Oct. 25, 1938 |
| 2,602,234 | Croker | July 8, 1952 |
| 2,744,333 | Eisele | May 8, 1956 |